(12) United States Patent
Widule

(10) Patent No.: US 6,629,328 B2
(45) Date of Patent: Oct. 7, 2003

(54) UNIVERSAL LIP LIFTING DEVICE

(75) Inventor: Thomas J. Widule, New Berlin, WI (US)

(73) Assignee: Kelley Company, Inc., Milwaukee, WI (US)

( * ) Notice: Subject to any disclaimer, the term of this patent is extended or adjusted under 35 U.S.C. 154(b) by 0 days.

(21) Appl. No.: 09/972,586

(22) Filed: Oct. 9, 2001

(65) Prior Publication Data

US 2003/0066144 A1 Apr. 10, 2003

(51) Int. Cl.[7] .................................................. E01D 1/00
(52) U.S. Cl. .......................................... 14/69.5; 14/71.3
(58) Field of Search .................................. 14/69.5, 71.3

(56) References Cited

U.S. PATENT DOCUMENTS

| 3,203,002 A | 8/1965 | McGuire |
| 3,249,956 A | 5/1966 | Zajac et al. |
| 3,500,486 A | 3/1970 | Le Clear |
| 3,606,627 A | 9/1971 | Potter |
| 3,662,416 A | 5/1972 | Brooks et al. |
| 4,047,258 A | 9/1977 | Burnham |
| 4,091,488 A | 5/1978 | Artzberger |
| RE30,104 E | 10/1979 | Burnham |
| 4,364,137 A | 12/1982 | Hahn |
| 4,398,315 A | 8/1983 | Driear et al. |
| 4,402,100 A | 9/1983 | Slusar |
| 4,525,887 A | 7/1985 | Erlandsson et al. |
| 4,718,136 A | 1/1988 | Fisher et al. |
| 4,937,906 A | 7/1990 | Alexander |
| 4,944,062 A | 7/1990 | Walker |
| 5,088,143 A | 2/1992 | Alexander |
| 5,323,503 A | 6/1994 | Springer |
| 5,475,888 A | 12/1995 | Massey |
| 5,553,343 A | 9/1996 | Alexander |
| 5,586,356 A | 12/1996 | Alexander |
| 5,832,554 A | 11/1998 | Alexander |
| 6,085,375 A | 7/2000 | Holm |
| 6,112,353 A | 9/2000 | Winter |
| 6,311,352 B1 * | 11/2001 | Springer ..................... 14/71.5 |

FOREIGN PATENT DOCUMENTS

WO    WO 01/07716 A1    2/2001

* cited by examiner

Primary Examiner—Robert E. Pezzuto
Assistant Examiner—Raymond W Addie
(74) Attorney, Agent, or Firm—Baker & Hostetler, L.L.P.

(57) ABSTRACT

A dock leveler includes a frame, a ramp, a lip, and a linkage. The ramp is rotatably coupled to the frame for rotation between a substantially horizontal first position and an inclined second position. The lip is coupled to the ramp for rotation between a pendent position and an extended position. The linkage is coupled to the lip and includes a pivot point and a centerline. The linkage supports the lip in the extended position when the pivot point is on a first side of the centerline and allows the lip to fall pendent under the force of gravity when the pivot point is on a second side of the centerline. The pivot point is moved from the first side of the centerline to the second side of the centerline when the lip is contacted by a vehicle that creates a downward moment on the lip.

9 Claims, 8 Drawing Sheets

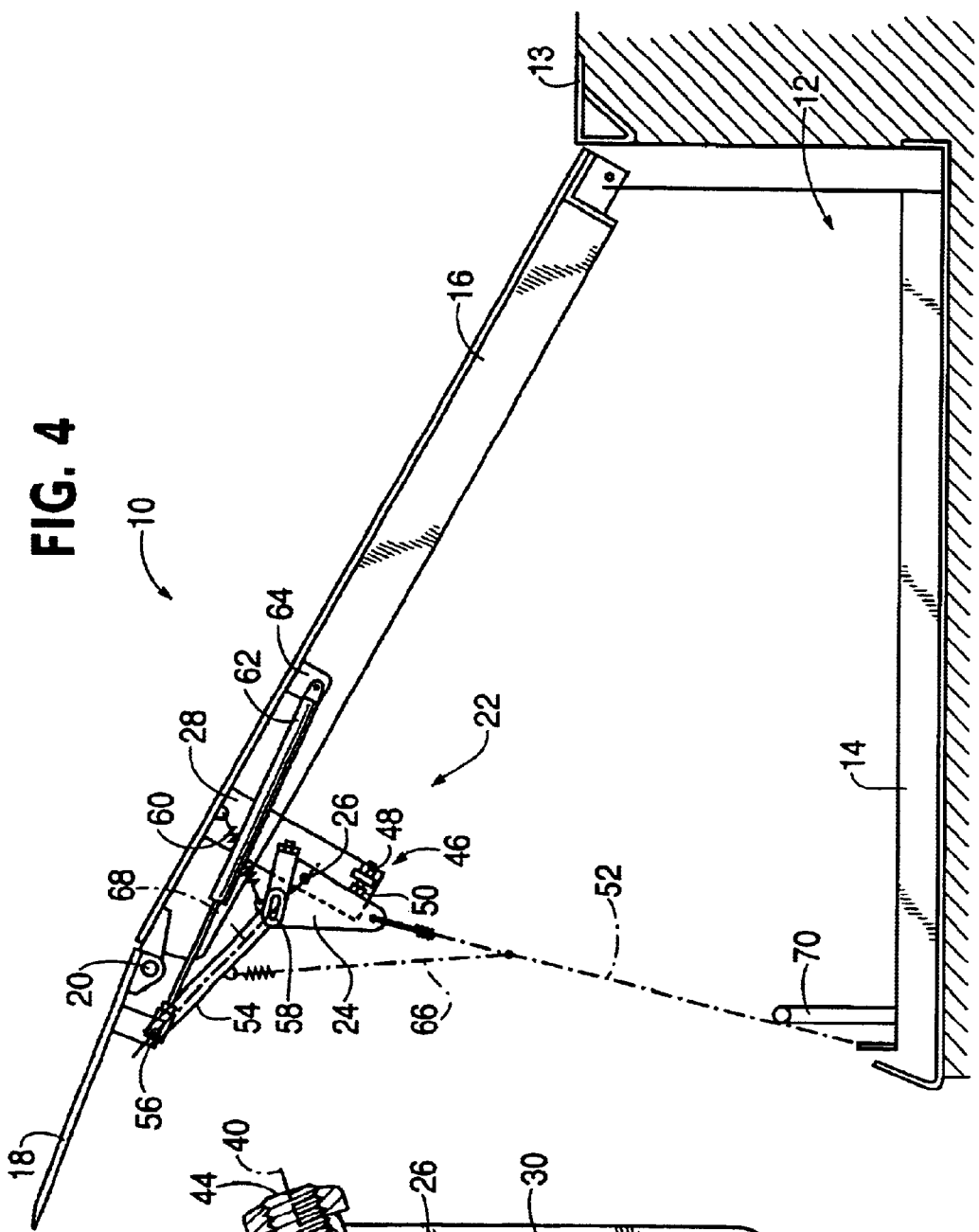
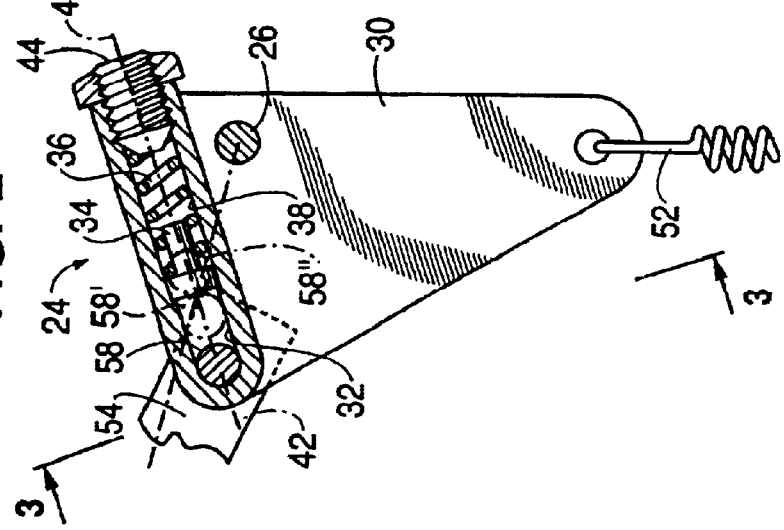

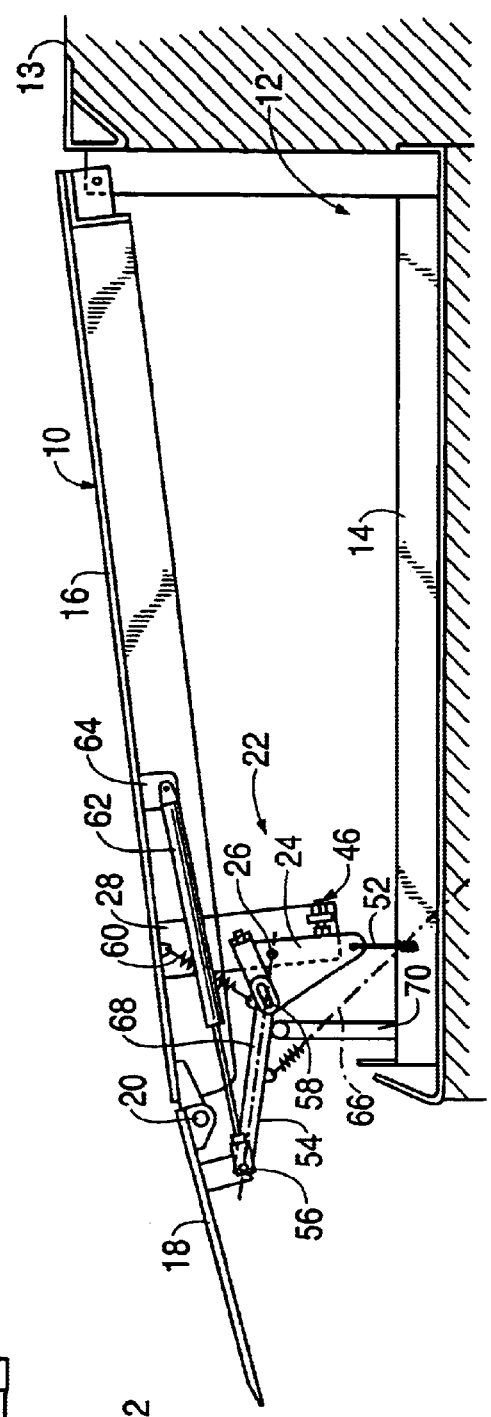

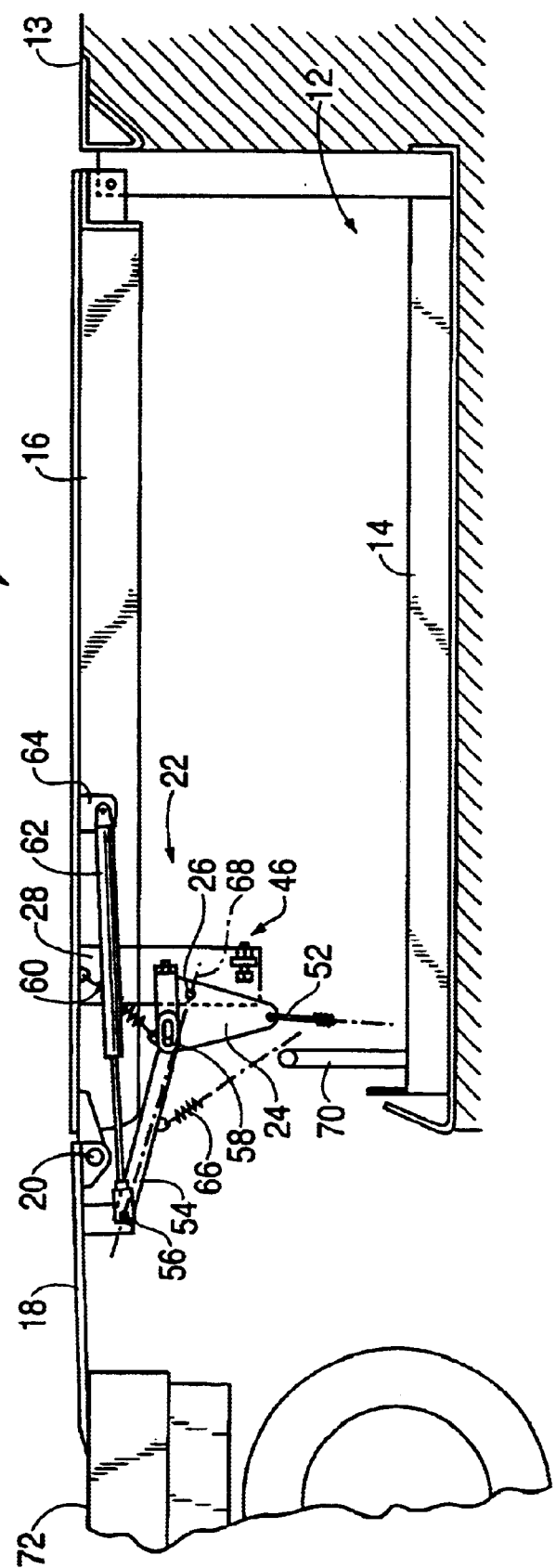

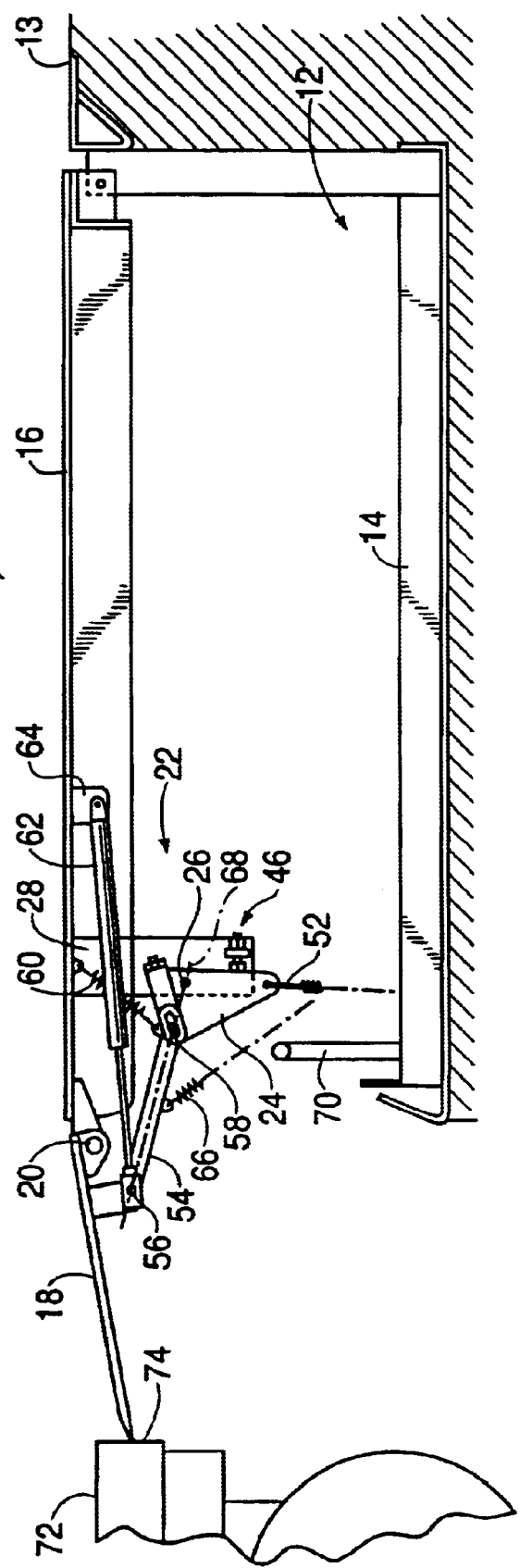

UNIVERSAL LIP LIFTING DEVICE

FIELD OF THE INVENTION

The invention relates to dock levelers, and more particularly to lip lifting devices for dock levelers.

BACKGROUND OF THE INVENTION

A dock leveler typically includes a frame or supporting structure mounted in a pit or depression in the loading dock. The rear end of a ramp or deck plate is pivotally mounted to the supporting structure so that the ramp is movable between an inclined position and a declined position relative to the horizontal loading dock.

An extension lip is commonly pivotally mounted to the forward end of the ramp. The lip is movable between a downwardly hanging pendent position and an extended position in which the lip forms an extension to the ramp.

After a vehicle (e.g., a truck or trailer) has parked in front of the loading dock in preparation for a loading or unloading operation, the ramp of the dock leveler is raised to its inclined position. As the ramp is moved, a lip lifting device pivots the lip outward to its extended position. When the ramp is lowered, the lip lifting device supports the lip in the extended position so that the extended lip engages the bed of the truck to support the ramp such that the ramp and the lip in combination bridge the gap between the loading dock and the truck bed. Typically, after the loading or unloading operation is completed, the ramp is raised and the linkage allows the lip to fall by gravity to its pendent position. The ramp is then lowered to a stored, horizontal position and the truck can then pull away from the loading dock.

Typical lip lifting devices include a rigid linkage that supports the lip in the extended position until: (i) the weight of the lip is supported by a truck bed such that the weight is removed from the linkage allowing a counterspring to release the linkage; (ii) the ramp is raised thereby releasing the linkage; or (iii) the ramp is lowered to a declined position such that the linkage contacts a kick out plate underneath the ramp in order to release the linkage. These rigid linkages do not allow for downward rotation of the lip when the lip being supported in the extended position. Therefore, the rigid linkages will fail (i.e., deform and/or break) when the lip is subjected to sufficient forces that tend to rotate the lip downward relative to the ramp. This can occur, for example, when a truck backs into a lip that is left in the extended position.

Some lift lifting devices are capable of supporting the lip in the extended position and allowing the lip to fall to the pendent position from the supported extended position when the lip encounters a sufficient amount of force at the end of the lip. One example of such a device is shown in U.S. Pat. No. 6,112,353, which discloses a lip extension mechanism that allows the linkage to disengage from supporting the lip when the lip is subjected to a substantial force. Specifically, a biased latch member yields and is moved out of engagement with a stop pin in response to a sufficient force.

SUMMARY OF THE INVENTION

The present invention is directed to a dock leveler having a lip lifting device that can hold the lip in the extended position, and will allow the lip to fall to the pendent position when subjected to a sufficient force on the lip. More specifically, the dock leveler includes a frame, a ramp, a lip, and a linkage. The ramp is rotatably coupled to the frame for rotation between a substantially horizontal first position and an inclined second position. The lip is coupled to the ramp for rotation between a pendent position and an extended position. The linkage is coupled to the lip and includes a pivot point and a centerline. The linkage supports the lip in the extended position when the pivot point is on a first side of the centerline and allows the lip to fall pendent under the force of gravity when the pivot point is on a second side of the centerline. The pivot point is moved from the first side of the centerline to the second side of the centerline when the lip is contacted by a vehicle that creates a downward moment on the lip.

The present invention is also directed to a bellcrank for raising and lowering a lip of a dock leveler. The bellcrank includes a substantially planar plate, a slot, and a plug. The slot is located on the plate and extends a distance across the plate. The plug at least partially extends into the slot and is biased toward one end of the slot.

The present invention is also directed to a method for lowering a lip after contact by a vehicle. The method includes supporting the lip in an extended position with a linkage having a pivot point on a first side of a centerline, creating a downward moment in the lip by contacting the lip with a vehicle, moving the pivot point of the linkage from the first side of the centerline to a second side of the centerline, and allowing the lip to fall to a pendent position with the pivot point of the linkage on the second side of the centerline.

Other features and advantages of the invention will become apparent to those skilled in the art upon review of the following detailed description, claims, and drawings.

BRIEF DESCRIPTION OF THE DRAWINGS

FIG. 2 is an enlarged cross section view of a bellcrank of the dock leveler shown in FIG. 1.

FIG. 3 is a side view taken along line 3—3 in FIG. 2.

FIG. 4 is a view similar to FIG. 1, illustrating a ramp in the inclined position and a lip in the extended position being supported by a linkage.

FIG. 6 is a view similar to FIG. 1, illustrating the ramp in the declined position and the lip in the extended position being supported by the linkage.

FIG. 7 is a view similar to FIG. 1, illustrating the ramp in an operating position and the lip in the extended position being supported by a vehicle bed.

FIG. 8 is a view similar to FIG. 1, illustrating the vehicle contacting the lip in the extended position while being supported by the linkage.

Figure 1:
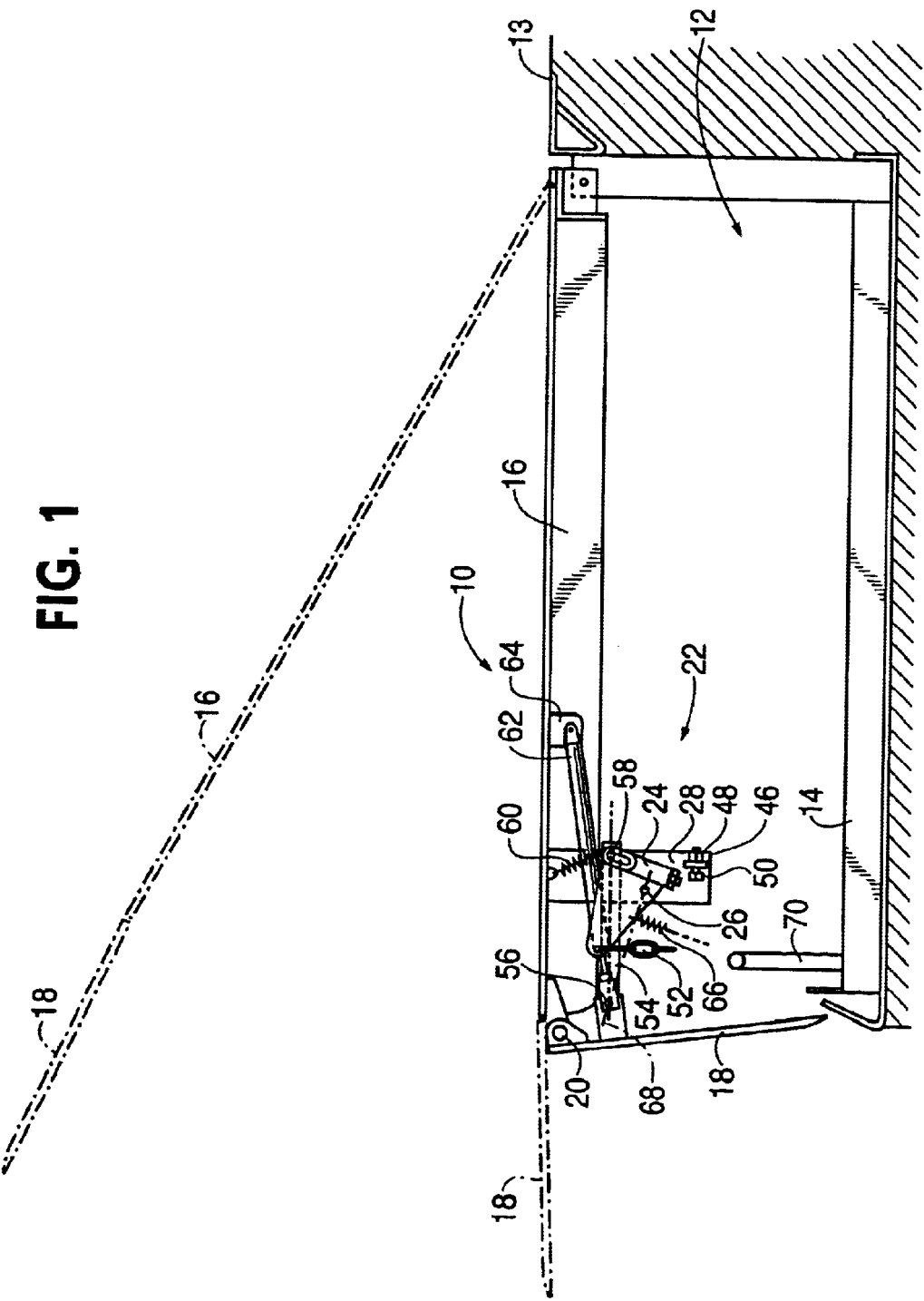
FIG. 1 is a side view of a dock leveler embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a dock leveler 10 that is mounted in a pit 12 in a loading dock 13. The dock leveler 10 includes a frame 14 mounted in the pit 12, and a ramp 16 pivotally mounted to the upper end of the frame 14 in a conventional manner. The ramp 16 is movable between multiple positions: (i) an upwardly inclined position above the loading dock 13 (FIG. 4); (ii) a generally horizontal, stored, or dock-level position that is flush and substantially co-planar with the loading dock 13 (FIG. 5); and (iii) a downwardly declined position below the level of the loading dock 13 (FIG. 6). The ramp 16 is moved between the various positions by conventional methods such as hydraulic actuators, springs, air inflatable bladders, or the like.

The dock leveler 10 further includes a lip 18 that is hinged to the forward end of the ramp 16 by a lip hinge pin 20. The lip 18 is pivotable from a pendent position (shown in solid lines) to an extended position (shown in broken lines).

The dock leveler 10 also includes a linkage 22 that is coupled to the lip 18. The linkage 22 is movable between a supporting condition that supports the lip 18 in the extended position and an unsupporting condition that allows the lip 18 to fall by gravity to the pendent position.

Figure 10:
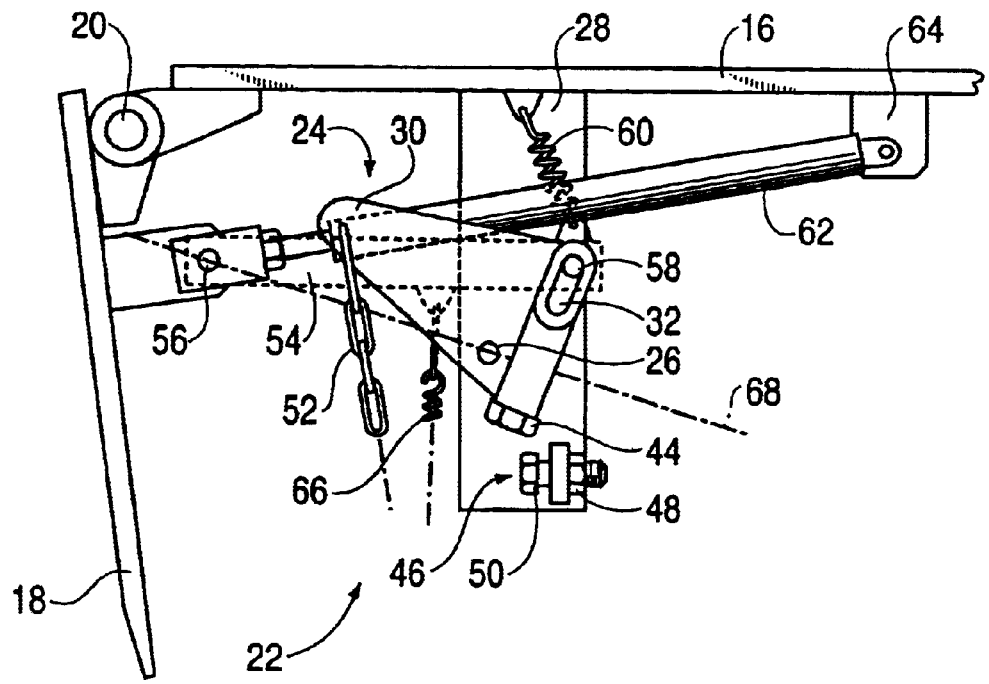
FIG. 10 is an enlarged side view of a linkage of the dock leveler shown in FIG. 1 illustrating the lip in the pendent position and a pivot point above a centerline.

With further reference to FIG. 10, the linkage 22 includes a bellcrank 24 that is pivotally connected at a fixed pivot 26 to a bracket 28 that is rigidly connected to the lower side of the ramp 16. As shown in FIGS. 2 and 3, the bellcrank 24 is generally triangular and includes a plate 30, a slot 32, and a plug 34. The plate 30 is substantially planar, and the slot 32 extends a distance along one side of the plate 30. The plug 34 partially extends into the slot 32 and is biased toward one end of the slot 32 by a spring 36. The spring 36 is located in a hollow member 38 that includes an axis 40 that is substantially aligned with a longitudinal axis 42 of the slot 32. The inner diameter of the hollow member 38 is greater than the width of the slot 32, and the diameter of the plug 34 is substantially equal to the inner diameter of the hollow member 38. The hollow member 38 extends partially into one end of the slot 32 such that the plug 34 is allowed to slide within the hollow member 38 while being prevented from extending completely into the slot 32. The spring 36 is maintained inside of the hollow member 38 by a set screw 44 fastened at the outer end of the hollow member 38.

The linkage 22 also includes a stop 46 that is mounted to the distal end of the bracket 28 below the bellcrank 24 to limit the counter-clockwise rotation of the bellcrank 24. The stop 46 includes a nut 48 and bolt 50 combination that allows adjustment of the position of the stop 46 thereby limiting the counterclockwise rotation of the bellcrank 24.

The linkage 22 also includes an extension tether 52 that is connected to the bellcrank 24 and the frame 14. The extension tether 52 is connected to the bellcrank 24 at a connection point that is spaced from the fixed pivot 26 such that a downward force acting through the tether rotates the bellcrank 24. The illustrated tether is a chain, however the tether could be any flexible connection that transfers a pulling force from one end to the other, such as a rope, spring, cable, or the like.

The linkage 22 further includes a push rod 54 that is pivotally connected to the lip 18 at a lip pivot 56 and pivotally and slidably connected within the slot 32 to the bellcrank 24 at a pivot point 58. Specifically, the push rod 54 includes a pivot rod 59 that extends through and slides within the slot 32. The push rod 54 raises and lowers the lip 18 in response to rotation of the bellcrank 24. A counterspring 60 is connected between the ramp 16 and the push rod 54 adjacent to the pivot point 58. The linkage 22 also includes an air spring 62 that is connected between the lip pivot 56 and a second bracket 64 that is rigidly connected to the lower side of the ramp 16. The air spring 62 assists the bellcrank 24 and the push rod 54 in extending the lip 18. A tether spring 66 connects the push rod 54 to the extension tether 52 such that the downward force acting through the extension tether 52 operates through the tether spring 66 to move the push rod 54 downward. The tether spring 66 also operates to control the direction that the extension tether 52 will lay when then ramp 16 is lowered.

Figure 9:
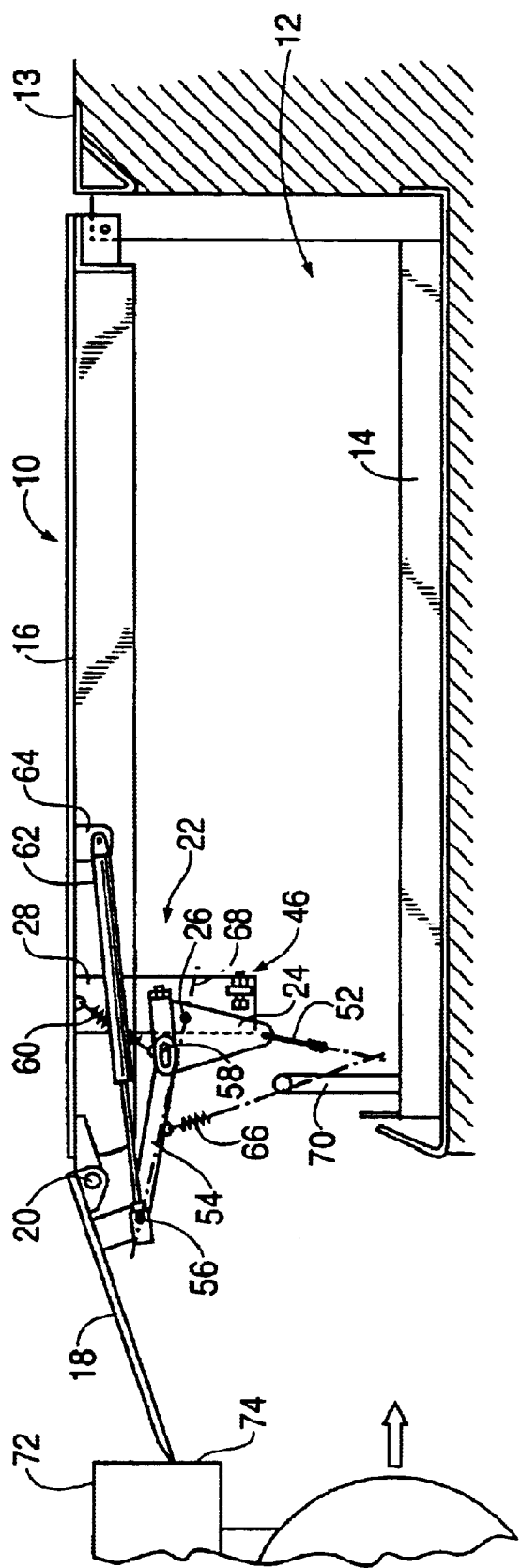
FIG. 9 is a view similar to FIG. 1, illustrating the vehicle further contacting the lip which is no longer supported by the linkage.

The operation of the dock leveler 10 will now be discussed with reference to FIGS. 1–10. FIGS. 1 and 9 illustrate the dock leveler 10 in a stored condition where the ramp 16 is in the horizontal position, the lip 18 is in the pendent position, and the linkage 22 is in an unsupporting condition. In the unsupporting condition, the weight of the lip 18 overcomes the force applied by the air spring 62 and rotates the bellcrank 24 to the position shown in FIG. 10.

In preparation of loading or unloading a vehicle, the ramp 16 is raised into a position illustrated in FIG. 4. The linkage 22 moves from the unsupporting condition to the supporting condition when the ramp 16 is raised such that the lip 18 is generally co-planar with the ramp 16 and forms an extension of the ramp 16. As the ramp 16 is raised from the horizontal position, the distance between the frame 14 and the bellcrank 24 increases beyond the length of the extension tether 52 such that the extension tether 52 and tether spring 66 provide a pulling force on the bellcrank 24 and the push rod 54, respectively. The pulling force supplied by the extension tether 52 rotates the bellcrank 24 counterclockwise. Counterclockwise rotation of the bellcrank 24 pushes the push rod 54 and raises the lip 18 into the extended position with the assistance of the air spring 62. Rotation of the bellcrank 24 also moves the pivot point 58 against the biasing force of the counterspring 60 below a centerline 68 that is defined by the lip pivot 56 and the pivot point 58.

Figure 11:
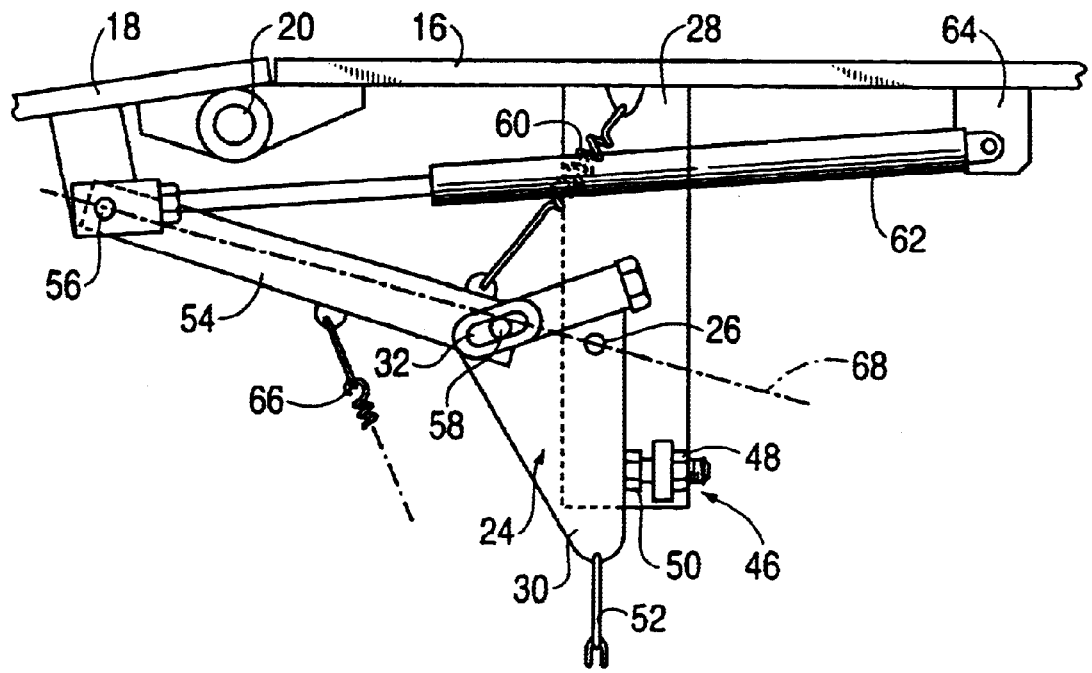
FIG. 11 is a view similar to FIG. 10, illustrating the lip in the extended position being supported by the linkage and the pivot point of the linkage below the centerline.

As shown in FIG. 11, when the pivot point 58 is located below the centerline 68, the linkage 22 is in the supporting condition. In the supporting condition, the weight of the lip 18 acts through the push rod 54 to create a counterclockwise moment in the bellcrank 24. After the bellcrank 24 contacts the stop 46, the weight of the lip 18 maintains the bellcrank 24 against the stop 46. When the bellcrank 24 is maintained against the stop 46, the pivot point 58 contacts the plug 34 of the bellcrank 24, however the weight of the lip 18 is not sufficient to overcome the biasing force of the spring 36 and therefore the pivot point 58 is maintained below the centerline 68 (58' in FIG. 2).

Figure 5:
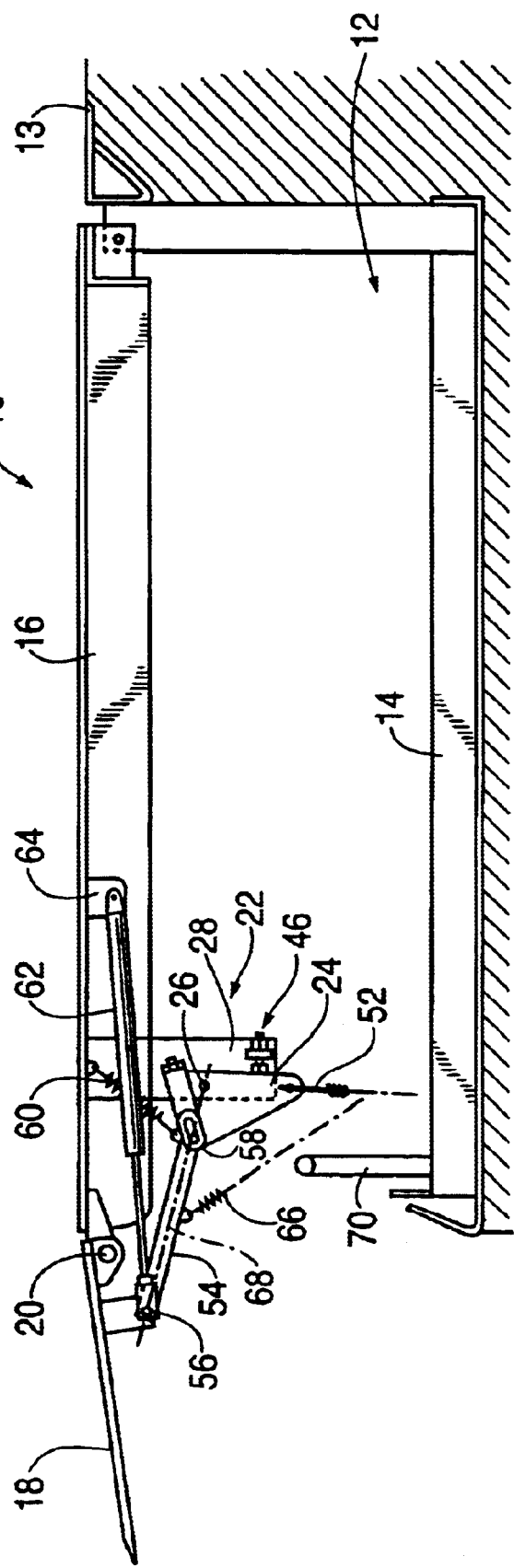
FIG. 5 is a view similar to FIG. 1, illustrating the ramp in the horizontal position and the lip in the extended position being supported by the linkage.

The linkage 22 continues to support the lip 18 in the extended position as the ramp 16 is lowered back to the horizontal position as shown in FIG. 5. The linkage 22 remains in the supporting condition as the ramp 16 is lowered so that the extended lip 18 engages the bed of the truck to support the ramp 16 such that the ramp 16 and the lip 18 in combination bridge the gap between the loading dock 13 and the vehicle bed. As the ramp 16 is lowered, slack is introduced into the extension tether 52 such that the associated pulling force is effectively removed from the bellcrank 24. Without the extension tether 52 forces, the weight of the lip 18 is exclusively responsible for maintaining the pivot point 58 below the centerline 68, therefore maintaining the bellcrank 24 against the stop 46 and the lip 18 in the extended position. The pivot point 58 is maintained in contact with the plug 34 of the bellcrank 24, and the weight of the lip 18 is not sufficient to overcome the biasing force of the spring 36 to move the pivot point 58 from below the centerline 68 to above the centerline 68.

As illustrated in FIG. 6, the linkage 22 also continues to support the lip 18 in the extended position when the ramp 16 is lowered into a declined position below the level of the loading dock 13. However, the linkage 22 transitions from the supporting condition to the unsupporting condition when the ramp 16 is lowered to the position where the push rod 54 contacts a kick-out plate 70. Further lowering of the ramp 16 causes the kick-out plate 70 to move the push rod 54 upwardly. The push rod moves the plug 34 within the hollow member 38 and compresses the spring, thereby moving the pivot point 58 above the centerline 68. When the pivot point 58 is above the centerline 68, the linkage 22 is in the unsupporting condition and the weight of the lip 18 overcomes the force applied by the air spring 62 and rotates the bellcrank 24 clockwise until the lip 18 falls completely to the pendent position (FIG. 10).

FIG. 7 illustrates the position of the linkage 22 after the ramp 16 and extended lip 18 are lowered into contact with a vehicle bed 72. Once the extended lip 18 is supported by the vehicle bed 72, the force applied to the bellcrank 24 from weight of the lip 18 is removed from the bellcrank 24. After the force that maintained the bellcrank 24 against the stop 46 is removed, the only force acting on the bellcrank 24 is the force applied by the counterspring 60. The counterspring 60 rotates the bellcrank 24 clockwise and moves the pivot point 58 above the centerline 68 such that the linkage 22 is moved into the unsupporting condition. After the loading or unloading is completed and the vehicle is driven away from the loading dock 13, the linkage 22 in the unsupporting condition allows the lip 18 to overcome the force of the air spring 62 and rotate the bellcrank 24 clockwise until the lip 18 falls completely to the pendent position (FIG. 10).

FIGS. 8 and 9 illustrate a vehicle 74 backing into a lip 18 that has been left in the extended position (FIG. 5). The vehicle 74 provides a substantially horizontal force that creates a downward moment on the lip 18 that moves the linkage 22 from the supporting condition to the unsupporting condition. More specifically, after the vehicle 74 contacts the lip 18, the lip 18 transfers a force that moves the pivot point 58 against the plug 34 such that the plug 34 compresses the spring 36. As the vehicle 74 continues to move toward the loading dock 13, the pivot point 58 compresses the spring 36 and moves from a point immediately below the centerline 68 (FIG. 8 and 58' of FIG. 2) to a point above the centerline 68 (FIG. 9 and 58" of FIG. 2). After the pivot point 58 moves within the slot 32 to a point above the centerline 68, the linkage 22 moves to the unsupporting position and the weight of the lip 18 rotates the bellcrank 24 clockwise until the lip 18 falls completely to the pendent position.

I claim:

1. A dock leveler adapted to be mounted to a loading dock, the dock leveler comprising:
    a ramp rotatable between a substantially horizontal first position and an inclined second position;
    a lip coupled to the ramp, the lip being rotatable between a pendent position and an extended position; and
    a linkage coupled to the lip, the linkage comprising a pivot point and a centerline, wherein the linkage supports the lip in the extended position when the pivot point is on a first side of the centerline and allows the lip to fall pendent under the force of gravity when the pivot point is on a second side of the centerline, the pivot point being moved from the first side of the centerline to the second side of the centerline when the lip is subjected to a sufficient force to create a downward moment on the lip,
    wherein the linkage further comprises:
        a push rod pivotally connected to the lip at a lip pivot; and
        a bellcrank pivotally connected to the ramp at a fixed pivot and pivotally connected to the push rod at the pivot point, and
    wherein the bellcrank includes a slot, the slot having a first end on the first side of the centerline and a second end on the second side of the centerline when the linkage supports the lip.

2. The dock leveler of claim 1, wherein the pivot point is located in the slot and biased toward the first end of the slot when the linkage supports the lip.

3. The dock leveler of claim 2, wherein the bellcrank includes a plug, the plug being at least partially located within the slot and biased toward the first end of the slot.

4. The dock leveler of claim 1, wherein contact with a vehicle moves the pivot point from the first side of the centerline to the second side of the centerline.

5. The dock leveler of claim 1, wherein the centerline is defined by the lip pivot and the fixed pivot.

6. The dock leveler of claim 1, wherein the linkage includes a stop, the stop limiting the rotation of the bellcrank when the pivot point is on the first side of the centerline.

7. The dock leveler of claim 1, wherein the pivot point of linkage moves from the second side to the first side of the centerline when the ramp is raised from the first position to the second position.

8. The dock leveler of claim 1, wherein the pivot point moves from the first side of the centerline to the second side of the centerline when the lip is supported by a vehicle bed.

9. The dock leveler of claim 1, wherein the first side of the centerline is below the centerline and the second side of the centerline is above the centerline.

\* \* \* \* \*